US009478075B1

(12) United States Patent
Toutant et al.

(10) Patent No.: US 9,478,075 B1
(45) Date of Patent: Oct. 25, 2016

(54) VEHICLE SAFETY-INSPECTION APPARATUS

(71) Applicants: Grant Toutant, Kamloops (CA); Duncan Smith, Kamloops (CA); Tristan Money, Port Alberni (CA)

(72) Inventors: Grant Toutant, Kamloops (CA); Duncan Smith, Kamloops (CA); Tristan Money, Port Alberni (CA)

( * ) Notice: Subject to any disclaimer, the term of this patent is extended or adjusted under 35 U.S.C. 154(b) by 0 days.

(21) Appl. No.: 14/687,443

(22) Filed: Apr. 15, 2015

(51) Int. Cl.

| | |
|---|---|
| ***G07C 5/00*** | (2006.01) |
| ***G01M 17/00*** | (2006.01) |
| ***G07C 5/02*** | (2006.01) |
| ***G07C 5/08*** | (2006.01) |
| ***B60K 28/10*** | (2006.01) |
| ***B60Q 5/00*** | (2006.01) |

(52) U.S. Cl.
CPC ............... *G07C 5/008* (2013.01); *B60K 28/10* (2013.01); *B60Q 5/005* (2013.01); *G07C 5/02* (2013.01); *G07C 5/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,784,800 | B2 | 8/2004 | Orzechowski | |
| 8,095,265 | B2 | 1/2012 | Boss | |
| 8,106,747 | B2 | 1/2012 | Nguyen | |
| 8,311,698 | B2 | 11/2012 | Boss | |
| 2005/0073435 | A1 | 4/2005 | Voeller | |
| 2006/0090558 | A1 | 5/2006 | Raskas | |
| 2006/0244568 | A1 | 11/2006 | Tong et al. | |
| 2008/0191874 | A1 | 8/2008 | Walker et al. | |
| 2009/0021343 | A1 | 1/2009 | Sinha | |
| 2009/0037044 | A1 * | 2/2009 | Enomoto | G07C 5/008 701/29.6 |
| 2010/0057318 | A1 * | 3/2010 | Nedachi | F16D 48/066 701/68 |
| 2012/0010774 | A1 | 1/2012 | McQuade et al. | |
| 2013/0006715 | A1 * | 1/2013 | Warkentin | G06Q 10/0639 705/7.38 |
| 2013/0176124 | A1 | 7/2013 | Brinton et al. | |
| 2013/0271606 | A1 | 10/2013 | Chiang | |
| 2014/0049390 | A1 | 2/2014 | Wagner et al. | |

FOREIGN PATENT DOCUMENTS

| | | |
|---|---|---|
| CN | 202110589 | 1/2012 |
| EP | 2727751 | 5/2014 |

* cited by examiner

*Primary Examiner* — Yonel Beaulieu
(74) *Attorney, Agent, or Firm* — Giuseppe Mariconda

(57) ABSTRACT

A vehicle safety-inspection apparatus is for a vehicle having a detectable-identification device fixedly mounted thereto at a predetermined visual inspection point of the vehicle. The vehicle safety-inspection apparatus includes a movable detector configured to detect the presence of the detectable-identification device in response to a user walking around the vehicle and positioning the movable detector proximate to the detectable-identification device during the vehicle safety-inspection of the vehicle. The movable detector is also configured to transmit a detection signal being configured to indicate the presence of the detectable-identification device that was detected. The recording assembly is configured to: (A) receive the detection signal from the detectable-identification device; (B) generate and store a detection-alarm record indicating that the detection signal was received by the recording assembly; and (C) transmit the detection-alarm record that was stored.

17 Claims, 3 Drawing Sheets

VEHICLE SAFETY-INSPECTION APPARATUS

TECHNICAL FIELD

This document relates to the technical field of (and is not limited to) a vehicle safety-inspection apparatus for a vehicle.

BACKGROUND

Operators (drivers) of commercial motor vehicles are required to perform periodic inspections of their commercial motor vehicles. These inspections help reduce collisions caused by mechanical defects and improve highway safety. Typically, a daily (pre-trip) vehicle inspection is performed. The purpose of the daily vehicle inspection is to ensure that problems and defects have been identified before the motor vehicle is operated on the highway or roadway. Inspections prevent the operation of a vehicle with problems that are likely to cause or contribute to the severity of an accident.

Legislation in some jurisdictions require mandatory daily (pre-trip or circle check) vehicle inspections that must be completed within 24 hours before driving.

Daily vehicle inspections includes (A) inspecting the vehicle before the vehicle is driven, (B) conducting the inspection with the use of a schedule listing the vehicle components and systems that require inspection, (C) completing an inspection report (the inspection and report are valid for 24 hours), (D) carrying the inspection schedule and report in the vehicle under operation, (E) recording, in a report, any defects found, and (F) repairing the defect found and identified (immediately or before the next dispatch) and keeping records of repair.

More specifically, the daily vehicle-safety inspection includes: (A) using an inspection procedure (circle procedure or the walk-around visual inspection) that best suits the vehicle and its location, in which each item must be inspected on the applicable inspection schedule, and (B) recording any defects discovered on the inspection report and notifying the operator about the defects. The safety inspection schedule is stored in the vehicle, as well as the inspection report (that remains valid for 24 hours).

If a minor defect on the vehicle is found, as defined in the inspection schedule, the defect must be recorded and reported to the operator as soon as possible. The operator is required to repair any defects that do not meet the performance standards.

If a major defect is found on the vehicle, as defined in the inspection schedule, the vehicle cannot be operated. The defect is recorded and reported to the operator immediately, and the vehicle must be repaired prior to driving of the vehicle.

If a defect as defined in the inspection schedule is identified after the inspection is completed, the defect must also be recorded and reported to the operator. Should the identified defect be a major defect, the driver is required to stop operating the vehicle until the defect is repaired.

SUMMARY

It will be appreciated that there exists a need to mitigate (at least in part) at least one problem associated with existing vehicle safety inspection methods. After much study of the known systems and methods with experimentation, an understanding of the problem and its solution has been identified and is articulated as follows:

Sometimes, a vehicle driver avoids performing a due diligence safety walk around a vehicle prior to starting and operating the vehicle. The reason for this is the inconvenience of performing the safety inspection. What is needed is a way to make vehicle inspection easier to perform.

To mitigate, at least in part, at least one problem associated with existing vehicle safety inspection methods, there is provided (in accordance with a major aspect) a vehicle safety-inspection apparatus. The vehicle safety-inspection apparatus is for a vehicle having a detectable-identification device fixedly mounted thereto at a predetermined visual inspection point of the vehicle. The vehicle safety-inspection apparatus includes a movable detector configured to detect the presence of the detectable-identification device in response to a user walking around the vehicle and positioning the movable detector proximate to the detectable-identification device during the vehicle safety-inspection of the vehicle. The movable detector is also configured to transmit a detection signal that is configured to indicate the presence of the detectable-identification device that was detected. The recording assembly is configured to receive the detection signal from the detectable-identification device. The recording assembly is also configured to generate and store a detection-alarm record indicating that the detection signal was received by the recording assembly. The recording assembly is also configured to transmit the detection-alarm record that was stored.

It will be appreciated that the vehicle may include any type of vehicle (commercial, non-commercial, etc.).

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1A:
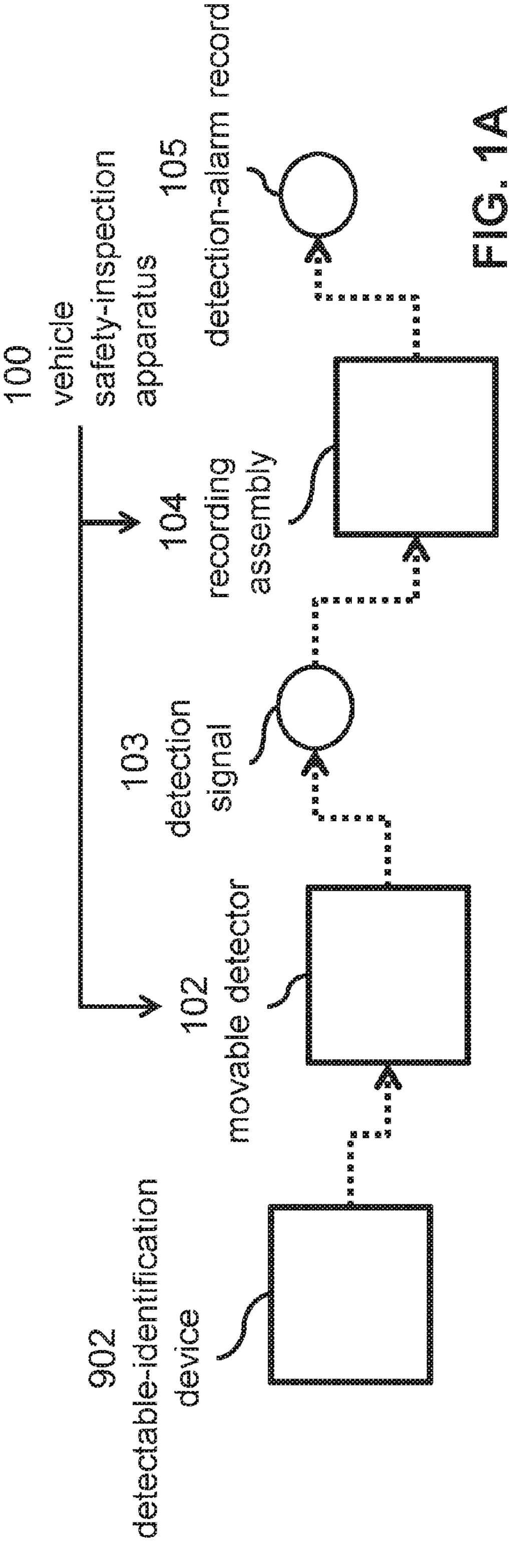
FIGS. 1A and 1B (SHEET 1 of 3 SHEETS) depict schematic views of embodiments of a vehicle safety-inspection apparatus for a vehicle having a detectable-identification device.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 vehicle safety-inspection apparatus
102 movable detector
103 detection signal
104 recording assembly
105 detection-alarm record
200 reader device
202 microcontroller
204 communications transmitter unit
206 power unit
300 communication receiver unit
302 microcontroller
304 beacon device
306 power unit
900 vehicle
902 detectable-identification device
904 keys
906 computer system

DETAILED DESCRIPTION OF THE EXEMPLARY EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 1B:
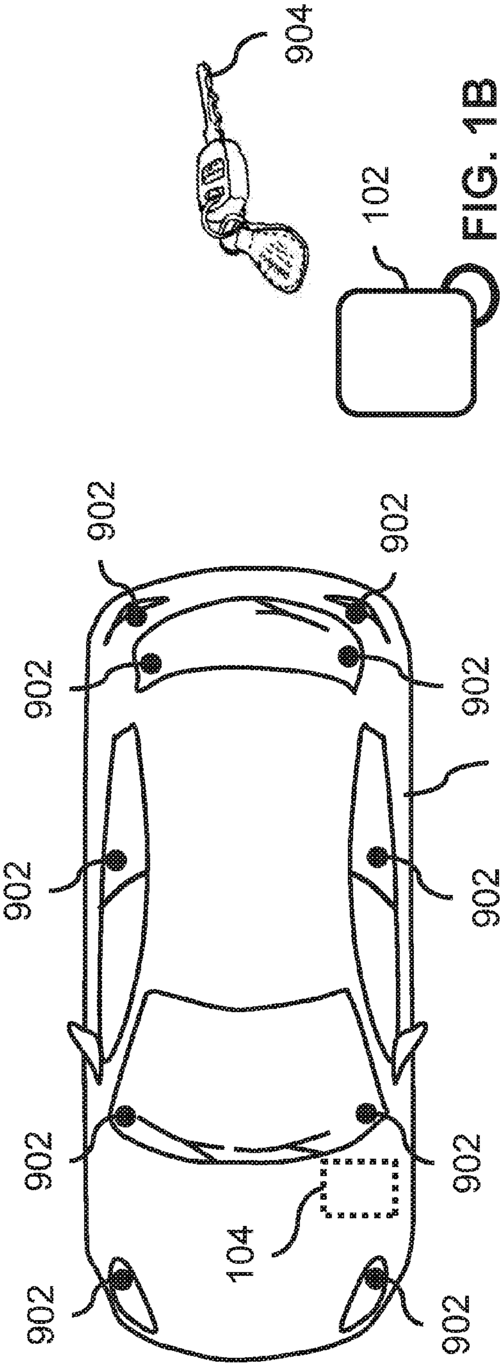

FIGS. 1A and 1B depict schematic views of embodiments of a vehicle safety-inspection apparatus 100 for a vehicle 900 having a detectable-identification device 902.

In accordance with the embodiments as depicted in FIGS. 1A and 1B, the vehicle 900 has a detectable-identification device 902 (such as an RFID tag, a bar code, etc.) fixedly mounted thereto at a predetermined visual inspection point of the vehicle 900. The detectable-identification device 902 may include an RFID tag (radio frequency identification tag) and any equivalent thereof. For instance, the vehicle 900 may include (and are not limited to) a tractor trailer, a car, etc., and any equivalent thereof. It will be appreciated that (in accordance with an embodiment) the vehicle safety-inspection apparatus 100 does not include the vehicle 900 and the detectable-identification device 902. It will be appreciated that (in accordance with another embodiment) the vehicle safety-inspection apparatus 100 does include the detectable-identification device 902 (if so desired), and does not include the vehicle 900.

In accordance with a first major embodiment, the vehicle safety-inspection apparatus 100 includes (and is not limited to) a combination of a movable detector 102 and a recording assembly 104.

The movable detector 102 is configured to detect (by way of a detector assembly) the presence of the detectable-identification device 902 in response to the user walking around the vehicle 900 and the user positioning the movable detector 102 proximate to the detectable-identification device 902 (during the vehicle safety-inspection of the vehicle 900 as the user walks around the vehicle 900). The movable detector 102 is also configured to transmit (by way of a transmit assembly) a detection signal 103 configured to indicate the presence of the detectable-identification device 902 that was detected (during the vehicle safety-inspection of the vehicle 900).

The recording assembly 104 is configured to receive the detection signal 103 from the detectable-identification device 902. The recording assembly 104 is configured to generate and store a detection-alarm record 105 indicating that the detection signal 103 was received by the recording assembly 104. The recording assembly 104 is configured to transmit the detection-alarm record 105 (that was stored).

An advantage associated with the vehicle safety-inspection apparatus 100 is that the vehicle safety-inspection apparatus 100 assists in relatively easier due diligence safety checking of the vehicle 900. The vehicle safety-inspection apparatus 100 is for verifying that the driver (an operator) was sufficiently close to one or more items to be inspected (on the vehicle 900) during the walk-around safety inspection to actually visually inspect the parts of the vehicle 900. The vehicle safety-inspection apparatus 100 may be configured to store (a memory unit) inspection related data, such as an inspection starting time, an inspection ending time, etc.

For instance, the movable detector 102 may be coupled to the keys 904 of the vehicle 900 (if so desired). In addition, the recording assembly 104 may be further configured to be fixedly mounted to an interior of the vehicle 900.

In accordance with a second major embodiment, the vehicle safety-inspection apparatus 100 includes (and is not limited to) the movable detector 102 without including the recording assembly 104.

In accordance with a third major embodiment, the vehicle safety-inspection apparatus 100 includes (and is not limited to) the recording assembly 104 without including the movable detector 102.

In accordance with a preferred embodiment, the detectable-identification device 902 includes an RFID tag (and any equivalent thereof). The RFID tag has a unique 32-bit identification code that permits about 4.3 billion unique identification codes. The operational range of the RFID tag is about two to about three centimeters. The detectable-identification device 902 is operatively attached to a predetermined component of the vehicle 900. In accordance with the embodiment depicted in FIG. 1B, instances of the detectable-identification device 902 are positioned on each headlight and each taillight of the vehicle 900 (so that the driver may verify that the lights of the vehicle 900 are operational or not damaged). In accordance with the embodiment depicted in FIG. 1B, instances of the detectable-identification device 902 are positioned on each window pane of the vehicle 900 (so that the driver may verify the windows are operational or not damaged).

The detectable-identification device 902 is positioned at points located on the vehicle 900 for visual inspection of the vehicle 900, so that the user (driver) can easily perform the visual safety inspection of the vehicle 900 (during a visual safety inspection walk around the vehicle 900).

Under normal operation, the user (the vehicle driver) inspects the exterior of the vehicle 900 (depicted in FIG. 1B). During the walk-around safety check, the user positions the movable detector 102 (also called a portable detector reader) in such a way that the movable detector 102 reads the detector identification information for each instance of the detectable-identification device 902 that is mounted to the predetermined portions or sections of the vehicle 900.

Upon reading the detector identification information from each instance of the detectable-identification device 902, the movable detector 102 (such as, the radio transmitter therein) is configured to transmit a deactivation signal to the recording assembly 104 (as a result of the user inspecting the vehicle 900 and positioning the movable detector 102 in such a way that the movable detector 102 reads the detector identification information for each instance of the detectable-identification device 902). In response, the recording assembly 104 is configured to: (A) deactivate the engine of the vehicle 900, or (B) to provide (transmit) a deactivation signal to an in-vehicle control unit (known and not depicted) that is mounted in the engine compartment of the vehicle 900 (and the in-vehicle control unit deactivates the engine of the vehicle 900). This arrangement allows the vehicle 900 to operate normally for the case where the detector identification information has been collected for each instance of the detectable-identification device 902. In this way, the vehicle safety-inspection apparatus 100 has verified that the user conducted a visual inspection of the vehicle 900.

For the case where the user (the driver) does not perform the safety inspection (by not collecting the detector identification information from each instance of the detectable-identification device 902), the recording assembly 104 is configured to activate an audible alarm (that is, activation of an audible alarm for the user) and/or to inhibit (directly or indirectly) the vehicle 900 (that is, inhibition of the vehicle 900) from starting (operating) until the visual safety inspection is performed by the user. For the case where some the detector identification information has not been collected by the movable detector 102 and transmitted to the recording assembly 104, and the user attempts to start the vehicle 900, the recording assembly 104 is activated to provide any one of an audible alarm, and an inhibition signal configured to inhibit the starting or operation of the vehicle 900, and the combination of the audible alarm and the inhibition signal. For the case where any part of the detector identification information is missing (that is, if some of the detector identification information is not received by the movable detector 102 and provided to the recording assembly 104), the recording assembly 104 prevents the vehicle 900 from starting, and alerts the user (the driver) of this condition. Once the alarm is issued to the user, the user is required to redo the visual safety inspection in order to collect all of the detector identification information from the instances of the detectable-identification device 902. In this manner, once all of the detector identification information is collected, the recording assembly 104 then stops inhibiting the operation of the vehicle 900 once the user attempts to start the vehicle 900.

For the case where the detector identification information was collected from each instance of the detectable-identification device 902, the recording assembly 104 is configured to permit operation of the vehicle 900.

For the case where the safety inspection was not successfully performed prior to starting the vehicle 900, the recording assembly 104 is configured to activate the alarm and/or deactivate the vehicle 900, and/or to activate the in-vehicle control unit (also called a vehicle inhibiting unit) to deactivate the vehicle 900 for a configurable time (a predetermined time).

For the case where the vehicle 900 is started during the predetermined time, the recording assembly 104 is configured to continue deactivation of the vehicle 900 after the end (termination) of the predetermined time (such as, 10 minutes) for the case where the vehicle 900 is stopped.

For the case where the vehicle 900 is started after the predetermined time has passed (has expired), and the required amount of the detector identification information has not been collected by the movable detector 102 and provided (transmitted) to the recording assembly 104, the recording assembly 104 is configured to continue to issue an alarm and/or cause the vehicle 900 to remain inhibited from operation (either directly or indirectly).

Figure 2:
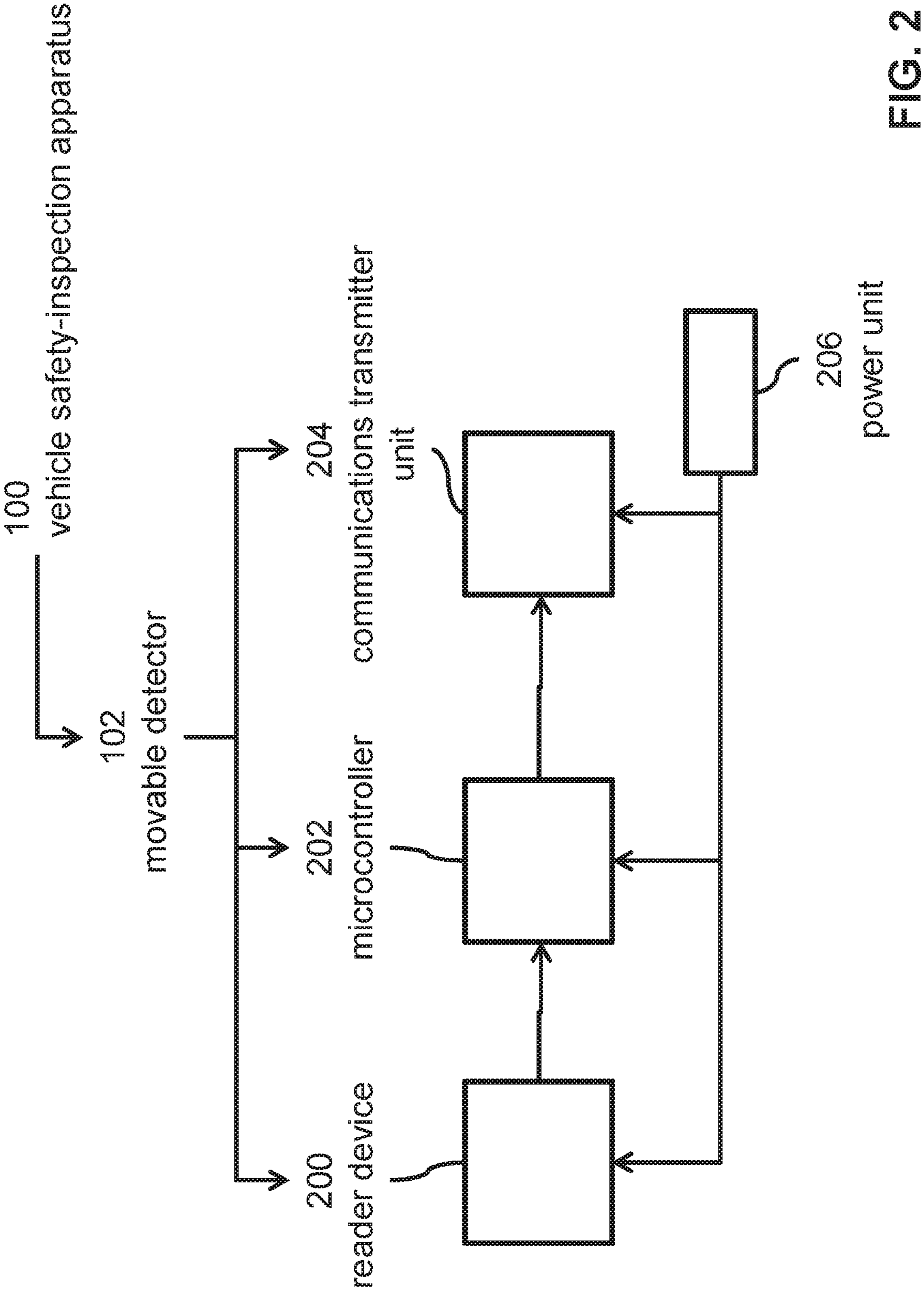
FIG. 2 (SHEET 2 of 3 SHEETS) depicts a schematic view of an embodiment of a movable detector of the vehicle safety-inspection apparatus of any one of FIGS. 1A and 1B.

FIG. 2 depicts a schematic view of an embodiment of a movable detector 102 of the vehicle safety-inspection apparatus 100 of any one of FIGS. 1A and 1B.

In accordance with the embodiment as depicted in FIG. 2, the movable detector 102 includes a reader device 200 configured to read the signal issued by the detectable-identification device 902, a microcontroller 202, and a communications transmitter unit 204. A power unit 206 (such as a battery) is operatively connected to the reader device 200, the microcontroller 202 and the communications transmitter unit 204 (to supply power). In accordance with a preferred embodiment (and not limited thereto), the communications transmitter unit 204 includes the XBEE (TRADEMARK) radio receiver module (and any equivalent thereof) manufactured by DIGI INTERNATIONAL (headquartered in Minnetonka, Minn., USA).

The microcontroller 202 is a relatively smaller computer mounted on a single integrated circuit containing a processor core, memory, and programmable input and output peripherals. The microcontroller 202 includes program memory in the form of ferroelectric RAM (random access memory), NOR flash memory, and/or OTP ROM (one-time programmable read only memory). NOR flash memory is a type of non-volatile storage technology that does not require power to retain data. The microcontroller 202 is configured to be embedded in the movable detector 102. The microcontroller 202 is configured to automatically control the movable detector 102. The microcontroller 202 provides an economical approach to digital control of the movable detector 102. The microcontroller 202 may be configured to integrate analog components for the control of non-digital electronic devices (if so desired). The microcontroller 202 may use four-bit words and operate at clock rate frequencies as low as about four kHz (kilo Hertz), for relatively lower power consumption. For instance, the microcontroller 202 may include an 8-bit microcontroller. It will be appreciated that the word length of the microcontroller 202 is not relevant to the operation of the vehicle safety-inspection apparatus 100 simply because the same functionality may be built with almost any type of architecture deployed in the microcontroller 202. The microcontroller 202 is configured to retain functionality while waiting for an event such as a button press or other interrupt. Power consumption of the microcontroller 202 while sleeping (a no usage mode of operation) is relatively low, suitable for longer lasting battery used in the power unit 206. The microcontroller 202 is operatively coupled to a memory unit (known and not depicted) that tangibly stores a microcontroller-executable program (also called software) that is configured to urge (instruct) the microcontroller 202 to execute operations (as described in the written description).

In accordance with a second major embodiment, the vehicle safety-inspection apparatus 100 includes (and is not limited to) the movable detector 102 without including the recording assembly 104. The movable detector 102 includes (and is not limited to) a combination of the reader device 200, the microcontroller 202 and the communications transmitter unit 204.

The reader device 200 is configured to detect presence of the detectable-identification device 902 (in response a user walking around the vehicle 900, and the user positioning the movable detector 102 proximate to the detectable-identification device 902 during vehicle safety-inspection of the vehicle 900).

The microcontroller 202 is configured to receive the presence of the detectable-identification device 902 that was detected from the reader device 200. The microcontroller 202 is also configured to generate the detection signal 103 (depicted in FIG. 1A) configured to indicate presence of the detectable-identification device 902 that was detected.

The communications transmitter unit 204 is configured to transmit the detection signal 103 to the recording assembly 104. The recording assembly 104 is configured to receive the detection signal 103 from the detectable-identification device 902. The recording assembly 104 is also configured to generate and store a detection-alarm record 105 indicating that the detection signal 103 was received by the recording assembly 104. The recording assembly 104 is also configured to transmit the detection-alarm record 105 that was stored.

Figure 3:
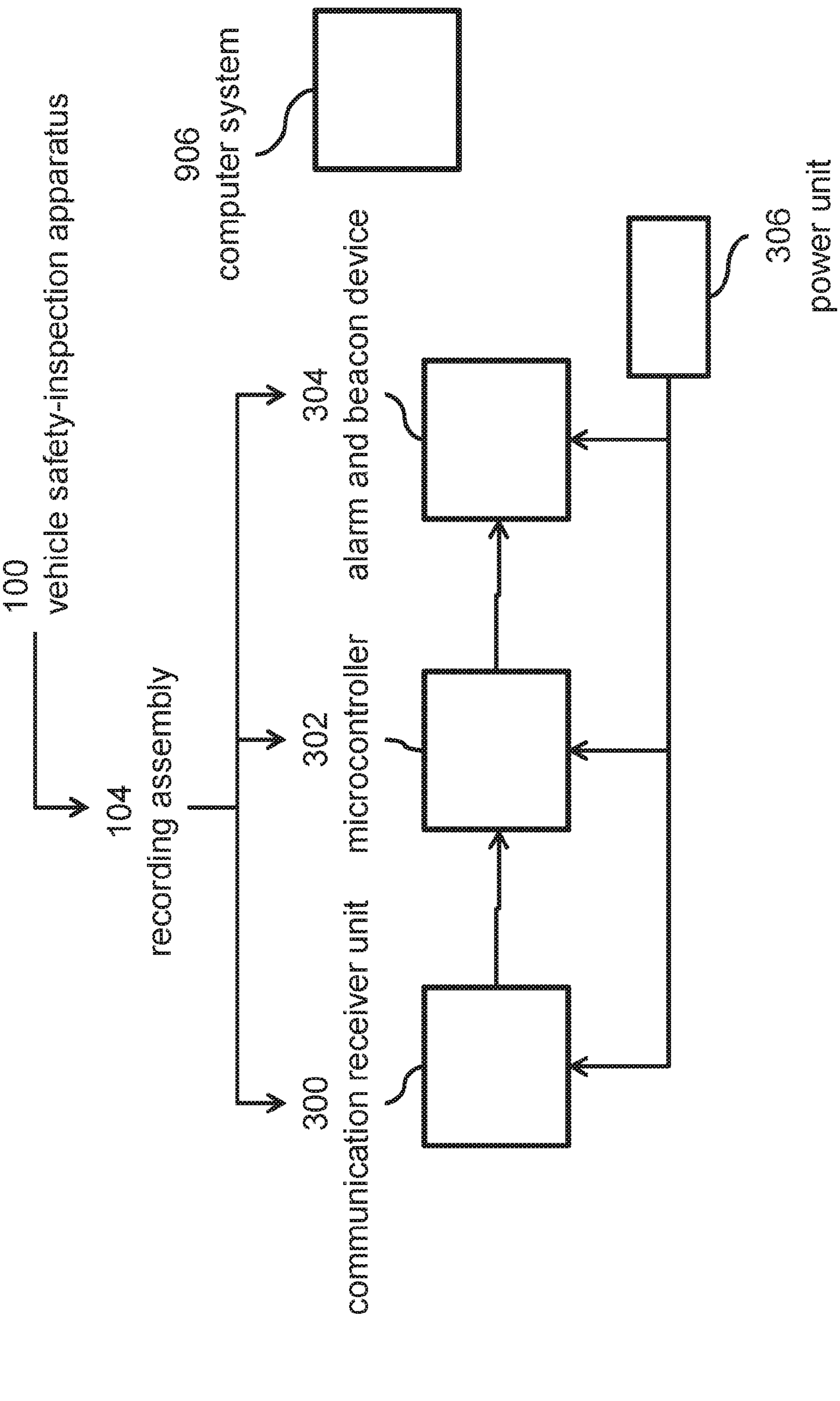
FIG. 3 (SHEET 3 of 3 SHEETS) depicts a schematic view of an embodiment of a recording assembly of the vehicle safety-inspection apparatus of any one of FIGS. 1A and 1B.

FIG. 3 depicts a schematic view of an embodiment of a recording assembly 104 of the vehicle safety-inspection apparatus 100 of any one of FIGS. 1A and 1B.

In accordance with the embodiment as depicted in FIG. 3, the recording assembly 104 includes a communication receiver unit 300, a microcontroller 302, and an alarm and beacon device 304. A power unit 306 is operatively connectable to the communication receiver unit 300, the microcontroller 302, and the alarm and beacon device 304 (to supply power thereto). In accordance with a preferred embodiment (and not limited thereto), the communication receiver unit 300 includes the XBEE (TRADEMARK) radio transmit module (and any equivalent thereof) manufactured by DIGI INTERNATIONAL (headquartered in Minnetonka, Minn., USA).

The microcontroller 302 is similar to the microcontroller 202, and the microcontroller 302 is used for the control of the recording assembly 104.

In accordance with a third major embodiment, the vehicle safety-inspection apparatus 100 includes (and is not limited to) the recording assembly 104 without including the movable detector 102. The recording assembly 104 includes (and is not limited to) the combination of the communication receiver unit 300, a microcontroller 302, and the alarm and beacon device 304.

The communication receiver unit 300 is configured to receive a detection signal 103 from a movable detector 102 configured to: (A) detect presence of the detectable-identification device 902 in response the user walking around the vehicle 900, and the user positioning the movable detector 102 proximate to the detectable-identification device 902 during vehicle safety-inspection of the vehicle 900. The communication receiver unit 300 is also configured to transmit the detection signal 103 configured to indicate presence of the detectable-identification device 902 that was detected.

The microcontroller 302 is configured to generate and store a detection-alarm record 105 indicating that the detection signal 103 was received by the communication receiver unit 300. The microcontroller 302 is operatively coupled to a memory unit (known and not depicted) that tangible stores a microcontroller-executable program (also called software) configured to urge the microcontroller 302 to execute operations (as described in the written description).

The alarm and beacon device 304 is configured to transmit the detection-alarm record 105 that was stored.

In accordance with a preferred embodiment, the recording assembly 104 is further configured to provide notification, to the vehicle driver, if the vehicle inspection was not performed prior to starting the vehicle 900. For instance, the recording assembly 104 may be further configured to transmit the detection-alarm record 105 to a computer system 906 in response to receiving a data request signal from the computer system 906.

Advantageously, the vehicle safety-inspection apparatus 100 assists in relatively easier due diligence safety checking of the vehicle 900.

The recording (collecting) of the identification data of the movable detector 102 during the vehicle walk inspection of the vehicle 900 may include collecting the user identification of the person who inspected the vehicle 900. For this case, the user has a user-identification badge with an instance of the detectable-identification device 902, and the movable detector 102 is used to collect the user identification, which is then recorded by the recording assembly 104 (for auditing of safety inspections at a later time).

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A vehicle safety-inspection apparatus for a vehicle having a detectable-identification device fixedly mounted thereto at a predetermined visual inspection point of the vehicle, the vehicle safety-inspection apparatus comprising:

a movable detector being configured to:

detect presence of the detectable-identification device in response to a user walking around the vehicle and positioning the movable detector proximate to the detectable-identification device during a vehicle safety-inspection of the vehicle; and transmit a detection signal being configured to indicate presence of the detectable-identification device that was detected; and a recording assembly being spaced apart from the movable detector, and the recording assembly being configured to:

receive the detection signal from the movable detector, which detected the presence of the detectable-identification device;

generate and store a detection-alarm record indicating that the detection signal was received by the recording assembly; and transmit the detection-alarm record that was stored; and the detectable-identification device is fixedly mounted to the vehicle;

the movable detector is configured, upon reading detector identification information from the detectable-identification device, to transmit a deactivation signal to the recording assembly as a result of the user inspecting the vehicle and positioning the movable detector in such a way that the movable detector reads the detector identification information for the detectable-identification device; and the recording assembly is configured to perform any one of:

deactivation of an engine of the vehicle; and transmission of the deactivation signal to an in-vehicle control unit mounted in an engine compartment of the vehicle, and the in-vehicle control unit deactivates the engine of the vehicle.

2. The vehicle safety-inspection apparatus of claim 1, wherein:

for the case where the detector identification information was not collected from the detectable-identification device, the recording assembly is configured to perform any one of:

activation of an audible alarm; and inhibition of the vehicle from starting until all of the detector identification information has been collected by the movable detector, and the movable detector transmits the detector identification information to the recording assembly.

3. The vehicle safety-inspection apparatus of claim 1, wherein:

for the case where the detector identification information was collected from the detectable-identification device, the recording assembly is configured to permit operation of the vehicle.

4. The vehicle safety-inspection apparatus of claim 1, wherein:

for the case where the detector identification information was not collected from the detectable-identification device, the recording assembly is configured to perform any one of:

activation of an audible alarm; and inhibition of the vehicle from starting until all of the detector identification information has been collected by the movable detector, and the movable detector transmits the detector identification information to the recording assembly; and for the case where the vehicle is started during a predetermined time, the recording assembly is configured to continue deactivation of the vehicle after termination of the predetermined time and the vehicle is stopped.

5. The vehicle safety-inspection apparatus of claim 4, wherein:

for the case where the vehicle is started after the predetermined time has expired, and a required amount of the detector identification information has not been collected by the movable detector and also transmitted to the recording assembly, the recording assembly is configured to continue to issue an alarm, and cause the vehicle to remain inhibited from operation.

6. The vehicle safety-inspection apparatus of claim 1, wherein:

the recording assembly is further configured to provide notification to a vehicle driver, for the case where a vehicle inspection was not performed prior to starting the vehicle.

7. The vehicle safety-inspection apparatus of claim 1, wherein:

the recording assembly is further configured to transmit the detection-alarm record to a computer system in response to receiving a data request signal from the computer system.

8. The vehicle safety-inspection apparatus of claim 1, wherein:

the recording assembly is further configured to be fixedly mounted to an interior of the vehicle.

9. A vehicle safety-inspection apparatus for a vehicle having a detectable-identification device fixedly mounted thereto at a predetermined visual inspection point of the vehicle, the vehicle safety-inspection apparatus comprising:

a movable detector being spaced apart from a recording assembly, and the movable detector being configured to:

detect presence of the detectable-identification device in response to a user walking around the vehicle and positioning the movable detector proximate to the detectable-identification device during a vehicle safety-inspection of the vehicle; and transmit a detection signal being configured to indicate presence of the detectable-identification device that was detected to the recording assembly, and the recording assembly being configured to: (A) receive the detection signal from the detectable-identification device; (B) generate and store a detection-alarm record indicating that the detection signal was received by the recording assembly; and (C) transmit the detection-alarm record that was stored; and the detectable-identification device is fixedly mounted to the vehicle;

the movable detector is configured, upon reading detector identification information from the detectable-identification device, to transmit a deactivation signal to the recording assembly as a result of the user inspecting the vehicle and positioning the movable detector in such a way that the movable detector reads the detector identification information for the detectable-identification device; and the recording assembly is configured to perform any one of:

deactivation of an engine of the vehicle; and transmission of the deactivation signal to an in-vehicle control unit mounted in an engine compartment of the vehicle, and the in-vehicle control unit deactivates the engine of the vehicle.

10. A vehicle safety-inspection apparatus for a vehicle having a detectable-identification device fixedly mounted thereto at a predetermined visual inspection point of the vehicle, the vehicle safety-inspection apparatus comprising:

a recording assembly being spaced apart from a movable detector, and the recording assembly being configured to:

receive a detection signal from the movable detector being configured to: (A) detect presence of the detectable-identification device in response to a user walking around the vehicle and positioning the movable detector proximate to the detectable-identification device during a vehicle safety-inspection of the vehicle; and (B) transmit the detection signal being configured to indicate presence of the detectable-identification device that was detected;

generate and store a detection-alarm record indicating that the detection signal was received by the recording assembly; and transmit the detection-alarm record that was stored; and the detectable-identification device is fixedly mounted to the vehicle;

the movable detector is configured, upon reading detector identification information from the detectable-identification device, to transmit a deactivation signal to the recording assembly as a result of the user inspecting the vehicle and positioning the movable detector in such a way that the movable detector reads the detector identification information for the detectable-identification device; and the recording assembly is configured to perform any one of:

deactivation of an engine of the vehicle; and transmission of the deactivation signal to an in-vehicle control unit mounted in an engine compartment of the vehicle, and the in-vehicle control unit deactivates the engine of the vehicle.

11. The vehicle safety-inspection apparatus of claim 10, wherein:

for the case where the detector identification information was not collected from the detectable-identification device, the recording assembly is configured to perform any one of:

activation of an audible alarm; and inhibition of the vehicle from starting until all of the detector identification information has been collected by the movable detector, and the movable detector transmits the detector identification information to the recording assembly.

12. The vehicle safety-inspection apparatus of claim 10, wherein:

for the case where the detector identification information was collected from the detectable-identification device, the recording assembly is configured to permit operation of the vehicle.

13. The vehicle safety-inspection apparatus of claim 10, wherein:

for the case where the detector identification information was not collected from the detectable-identification device, the recording assembly is configured to perform any one of:

activation of an audible alarm; and inhibition of the vehicle from starting until all of the detector identification information has been collected by the movable detector, and the movable detector transmits the detector identification information to the recording assembly; and for the case where the vehicle is started during a predetermined time, the recording assembly is configured to continue deactivation of the vehicle until after termination of the predetermined time.

14. The vehicle safety-inspection apparatus of claim 13, wherein:

for the case where the vehicle is started after the predetermined time has expired, and a required amount of the detector identification information has not been collected by the movable detector and also transmitted to the recording assembly, the recording assembly is configured to continue to issue an alarm, and cause the vehicle to remain inhibited from operation.

15. The vehicle safety-inspection apparatus of claim 10, wherein:

the recording assembly is further configured to:

provide notification, to a vehicle driver, for the case where a vehicle inspection was not performed prior to starting the vehicle.

16. The vehicle safety-inspection apparatus of claim 10, wherein:

the recording assembly is further configured to transmit the detection-alarm record to a computer system in response to receiving a data request signal from the computer system.

17. The vehicle safety-inspection apparatus of claim 10, wherein:

the recording assembly is further configured to be fixedly mounted to an interior of the vehicle.

* * * * *